(No Model.) 2 Sheets—Sheet 1.
J. M. CURTICE.
KITCHEN CABINET.
No. 435,579. Patented Sept. 2, 1890.
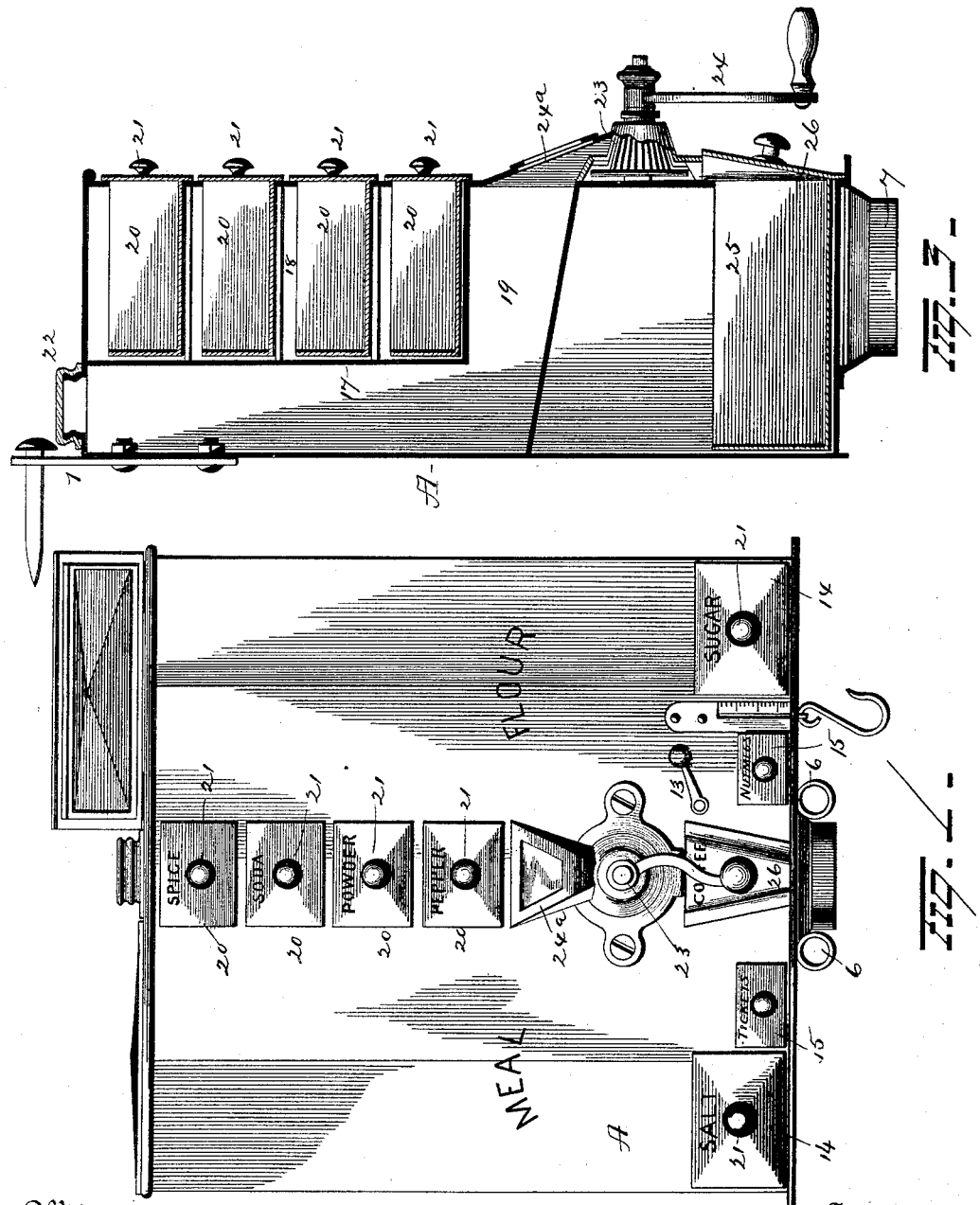

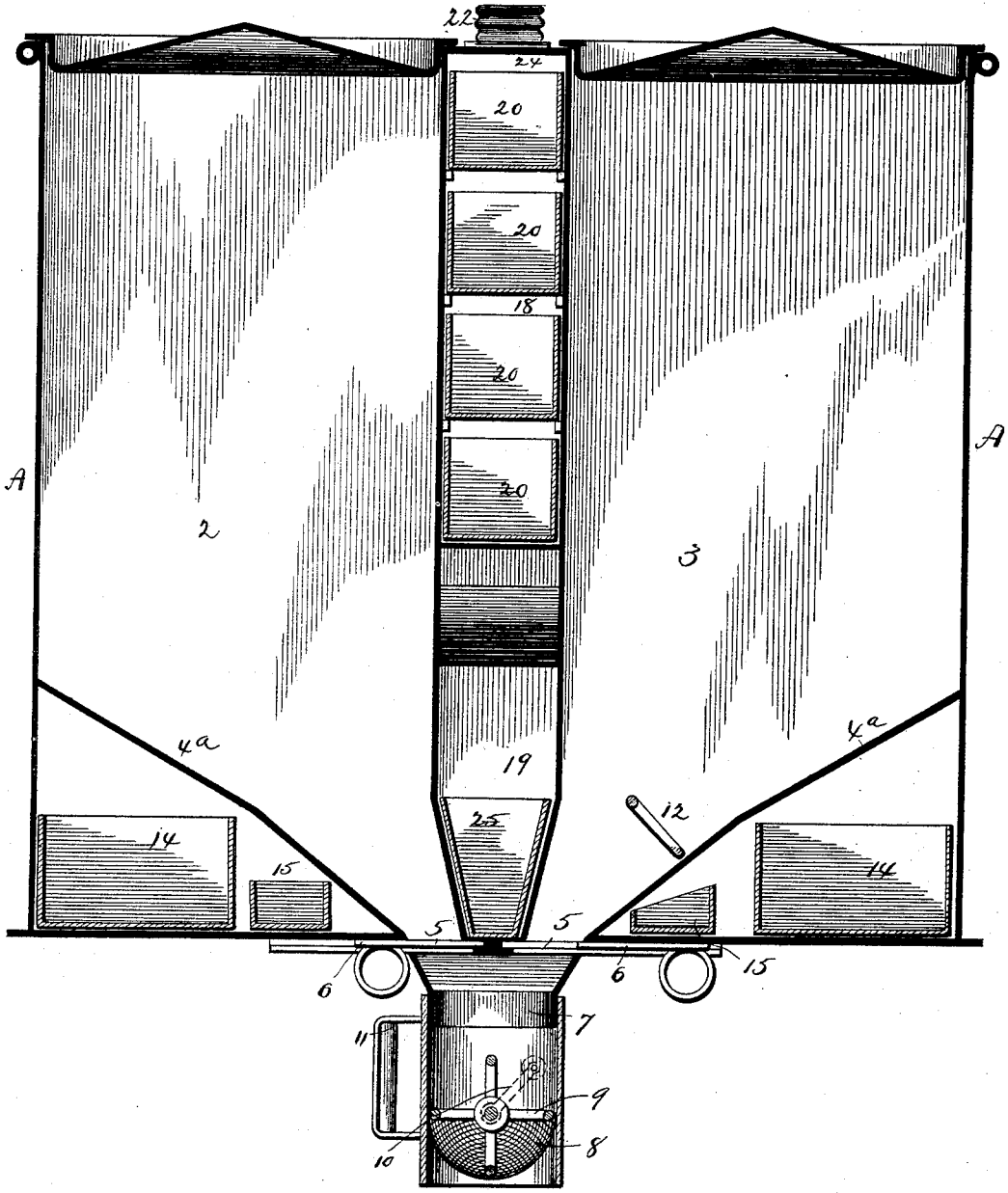

UNITED STATES PATENT OFFICE.

JESSE M. CURTICE, OF LOUISVILLE, KENTUCKY.

KITCHEN-CABINET.

SPECIFICATION forming part of Letters Patent No. 435,579, dated September 2, 1890.

Application filed August 10, 1889. Serial No. 320,386. (No model.)

*To all whom it may concern:*

Be it known that I, JESSE M. CURTICE, of Louisville, in the county of Jefferson and State of Kentucky, have invented certain new and useful Improvements in Kitchen-Cabinets; and I do hereby declare the following to be a full, clear, and exact description of the invention, such as will enable others skilled in the art to which it appertains to make and use the same.

My invention relates to an improvement in kitchen-cabinets, the object being to provide a cheap, convenient, and accessible repository for holding all the most essential ingredients for cooking or seasoning food and keeping them out of the way of insects or vermin and protected from dirt or moisture.

A still further object is to provide for grinding the coffee, sifting flour, and weighing the ingredients bought or used.

With these ends in view my invention consists in certain novel features of construction and combinations of parts, as will be hereinafter described, and pointed out in the claims.

In the accompanying drawings, Figure 1 is a front elevation. Fig. 2 is a vertical longitudinal section, and Fig. 3 is a vertical transverse section.

A represents the body of the cabinet, it preferably consisting of sheet metal, such as tin or galvanized iron. Its back is flat and adapted to rest against the wall, whereon the cabinet is intended to be hung by means of the straps or hangers 1 1. The front may be variously formed, while the sides and bottom are usually straight and plane, with the exception of certain features which, in the case of the latter, will be adverted to hereinafter.

The cabinet is divided inside into a pair of equal-sized compartments 2 and 3, which are used, respectively, for "Meal" and "Flour," as indicated on the outside, by means of a narrow central compartment 4, which extends from the top of the cabinet to the bottom, forming a double-walled partition between the meal and flour compartments, and also more particularly to receive other articles which naturally occupy less space and which will receive attention later. The bottoms 4ª 4ª of the compartments 2 and 3 are given considerable slope from the sides toward the center of the cabinet, where outlets 5 5 are formed for the discharge of the contents as required for use in making bread. At this point slides 6 6 are furnished, and the size of the openings is controlled by pushing them out or in, as the case may be. Spout 7, located beneath these outlets, guides the contents out into a pan or other receptacle placed beneath to catch it. I usually fit a sieve 8 over this spout, through which, by turning the beaters 9, I force the flour or meal, removing all lumps or impurities. These beaters are turned by means of a crank 10 from the outside, and the sieve is so constructed and furnished with a handle 11 that it may be removed and used independently of the cabinet, if desired.

Owing to the tendency of flour to pack, a stirrer or force-feed device 12 is adapted to turn in the lower end of compartment 3, and is provided with a crank and knob 13 on the outside, by which it is turned when necessary. The space between the sloping bottoms of the flour and meal compartments and the bottom is occupied by drawers 14 14, in which "Salt" and "Sugar," as indicated, are contained. In the more restricted part of this space, as it gets nearer the center, small drawers 15 15 for such articles as ice-tickets, nutmegs, &c., are placed, and in some convenient place conveniently between the nutmeg-drawer and the sugar-drawer spring-scales 16 are affixed in the front of the cabinet, by means of which either the ingredients may be proportioned or any other articles may be weighed. The central compartment 4 is subdivided by an L-shaped partition-wall 17 into two chambers 18 19, the former or front one to receive a row of drawers 20 20 of a suitable size to hold spices and similar articles, such as "Pepper," "Powder," "Soda," or "Spice," as the labels indicate. All of these drawers are provided with knobs 21, and it is evident that more or less or larger or smaller ones may be used, or that various articles may be placed in them to suit convenience. The chamber 19, located back and beneath the partition 17, extends from the top of the central compartment, where it is furnished with a removable screw-cap 22 nearly to the bottom of the cabinet, and it has a forwardly-sloping bottom. This chamber is intended for coffee, and to this end a grinding-mill 23 is placed in position to receive the coffee, which is automatically fed by the slope of the bottom into the mill. The mill is operated by the usual crank 24, and there is a glass $24^a$ in its face, through which the supply of the coffee inside may be determined. A drawer 25 in the space below the mill receives the ground coffee as fast as it passes through the spout 26. In such a repository all of the aroma of the coffee is retained in the kernel, and thus its full strength is preserved. The compartments 2 and 3 have hinged doors over them, and through them the compartments are replenished. The covers are then closed and all dust or objectionable materials are kept out. Thus from the foregoing it will be seen that all the essential articles used in cooking are where they can be quickly found and within reach of the cook, and besides are kept clean and protected.

Having fully described my invention, what I claim as new, and desire to secure by Letters Patent, is—

1. As an improved article of manufacture, a kitchen-cabinet consisting of a body divided into three compartments, the two outer compartments having inwardly-sloping bottoms and the central compartment having a bottom sloping in a vertical plane at right angles to the bottoms of the outer compartments, the latter compartments having a common discharge-spout below the central compartment and slides in their bottoms to regulate the discharge of their contents, and a coffee-mill beneath the central compartment into which the latter discharges its contents.

2. As an improved article of manufacture, a kitchen-cabinet consisting of a body divided into three compartments, the two outer compartments having inwardly-sloping bottoms and the central compartment having a bottom sloping in a vertical plane at right angles to the bottoms of the other compartments, the latter compartments having a common discharge-spout below the central compartment and slides in their bottoms to regulate the discharge of their contents, the central compartment being divided into two chambers, one having drawers therein and the other having an opening in each end, a coffee-mill into which the latter discharges its contents, and a drawer beneath the mill for catching the ground coffee from the mill, substantially as set forth.

In testimony whereof I have signed this specification in the presence of two subscribing witnesses.

JESSE M. CURTICE.

Witnesses:
W. H. CURTICE,
M. F. BROWN.